United States Patent [19]

Borchardt

[11] Patent Number: 4,508,629

[45] Date of Patent: Apr. 2, 1985

[54] METHOD OF VISCOSIFYING AQUEOUS FLUIDS AND PROCESS FOR RECOVERY OF HYDROCARBONS FROM SUBTERRANEAN FORMATIONS

[75] Inventor: John K. Borchardt, Duncan, Okla.

[73] Assignee: Halliburton Company, Duncan, Okla.

[21] Appl. No.: 483,356

[22] Filed: Apr. 8, 1983

[51] Int. Cl.³ .................. C09K 7/02; E21B 43/22
[52] U.S. Cl. ................. 252/8.55 D; 166/275; 166/305 R; 252/8.5 A; 252/8.55 R
[58] Field of Search ............ 252/8.55 R, 8.55 D, 252/315.3, 8.5 A, 8.5 B, 8.5 C; 166/274, 275, 305 R

[56] References Cited

U.S. PATENT DOCUMENTS

| | | | |
|---|---|---|---|
| 2,827,964 | 3/1958 | Sandiford et al. | 166/9 |
| 3,000,790 | 9/1961 | Jeanes et al. | 195/31 |
| 3,007,879 | 11/1961 | Jordan | 252/352 |
| 3,039,529 | 6/1962 | McKennon | 166/9 |
| 3,046,272 | 7/1962 | Strating et al. | 260/233.3 |
| 3,136,360 | 6/1964 | Ramos et al. | 166/12 |
| 3,223,163 | 12/1965 | Koch et al. | 166/33 |
| 3,308,885 | 3/1967 | Sandiford | 166/33 |
| 3,334,689 | 8/1967 | McLaughlin | 166/33 |
| 3,367,418 | 2/1968 | Routson | 166/9 |
| 3,374,834 | 3/1968 | Ramos et al. | 166/33 |
| 3,376,282 | 4/1968 | Schweiger | 260/209.6 |
| 3,405,106 | 10/1968 | Scanley | 260/80 |
| 3,406,754 | 10/1968 | Gogarty | 166/9 |
| 3,421,584 | 1/1969 | Eilers et al. | 166/33 |
| 3,467,647 | 9/1969 | Benninga | 260/209 |
| 3,502,149 | 3/1970 | Pence, Jr. | 166/295 |
| 3,557,562 | 1/1971 | McLaughlin et al. | 61/41 |
| 3,649,574 | 3/1972 | Cole | 260/17.4 R |
| 3,658,734 | 4/1972 | Pettitt | 260/17.4 ST |
| 3,765,918 | 10/1973 | Jordan et al. | 106/205 |
| 3,780,806 | 12/1973 | Bott | 166/275 |
| 3,829,412 | 8/1974 | Kunz | 260/209 R |
| 3,857,443 | 12/1974 | Cole | 166/295 |
| 3,926,258 | 12/1975 | Hessert et al. | 166/294 |
| 3,973,629 | 8/1976 | Knight et al. | 166/295 |
| 3,988,246 | 10/1976 | Hartfiel | 252/8.55 R |
| 4,016,086 | 4/1977 | Norton et al. | 252/8.55 D |
| 4,038,206 | 7/1977 | Karl | 252/8.55 R |
| 4,040,484 | 8/1977 | Hessert | 166/294 |
| 4,043,921 | 8/1977 | Hessert et al. | 252/8.5 C |
| 4,058,509 | 11/1977 | Menand et al. | 252/8.5 C |
| 4,060,132 | 11/1977 | Chiesa, Jr. | 169/47 |
| 4,060,490 | 11/1977 | Bernard | 252/8.55 D |
| 4,094,795 | 6/1978 | DeMartino et al. | 252/8.55 R |
| 4,098,337 | 7/1978 | Argabright et al. | 166/270 |
| 4,098,700 | 7/1978 | Hartfiel | 252/8.55 R |
| 4,104,183 | 8/1978 | Carter et al. | 252/8.55 D |
| 4,137,400 | 1/1979 | DeMartino et al. | 252/8.55 R |
| 4,146,486 | 3/1979 | Hessert et al. | 252/8.55 C |
| 4,146,705 | 3/1979 | Knutson, Jr. | 536/1 |
| 4,149,599 | 4/1979 | Chiesa, Jr. | 169/47 |
| 4,162,925 | 7/1979 | Tiefenthaler et al. | 106/208 |
| 4,169,798 | 10/1979 | DeMartino | 252/8.55 R |
| 4,169,818 | 10/1979 | DeMartino | 260/17 R |
| 4,172,055 | 10/1979 | DeMartino | 260/17 R |
| 4,178,265 | 12/1979 | Matsuda et al. | 252/316 |
| 4,191,249 | 3/1980 | Sarem | 166/279 |
| 4,191,657 | 3/1980 | Swanson | 252/8.55 R |
| 4,192,727 | 3/1980 | Ward | 204/159.12 |
| 4,196,777 | 4/1980 | Kalfoglou | 252/8.55 D |
| 4,216,828 | 8/1980 | Blair, Jr. | 166/274 |
| 4,217,146 | 8/1980 | Avdzhiev et al. | 106/285 |
| 4,217,230 | 8/1980 | Hunter | 252/8.55 D |
| 4,217,955 | 8/1980 | Sigmund et al. | 166/252 |
| 4,217,956 | 8/1980 | Goss et al. | 166/272 |
| 4,217,957 | 8/1980 | Schievelbein | 252/8.55 D |
| 4,247,402 | 1/1981 | Hartfiel | 252/8.55 R |
| 4,256,590 | 3/1981 | Naslund et al. | 252/8.55 D |
| 4,296,203 | 10/1981 | Wernau | 252/8.55 D |
| 4,297,226 | 10/1981 | Hunter | 252/8.55 D |
| 4,335,787 | 6/1982 | Stapp | 166/273 |
| 4,350,601 | 9/1982 | Mosier et al. | 252/8.55 R |
| 4,353,805 | 10/1982 | Kragen et al. | 252/8.55 D |
| 4,374,740 | 2/1983 | Chen | 166/275 |
| 4,415,463 | 11/1983 | Mosier et al. | 252/8.55 R |
| 4,436,672 | 3/1984 | Naylor | 252/8.55 D |

*Primary Examiner*—Stephen J. Lechert, Jr.
*Assistant Examiner*—Howard J. Locker
*Attorney, Agent, or Firm*—Robert A. Kent; Thomas R. Weaver

[57] ABSTRACT

The present invention relates to a method of viscosifying aqueous fluids and a viscosifying composition which when admixed with an aqueous fluid produces a viscosity increase in the fluid in excess of the additive viscosity of the individual composition components. The viscosifying composition comprises xanthan gum and at least one member selected from the group consisting of the ammonium, hydrogen or alkali metal salts of polystyrene sulfonate, polyvinyl sulfonate and hydrolyzed copolymers of styrene sulfonate and maleic anhydride.

4 Claims, No Drawings

METHOD OF VISCOSIFYING AQUEOUS FLUIDS AND PROCESS FOR RECOVERY OF HYDROCARBONS FROM SUBTERRANEAN FORMATIONS

BACKGROUND OF THE INVENTION

1. Field of the Invention

The present invention relates to the treatment of subterranean hydrocarbon-containing formations with viscous aqueous polymer solutions, and particularly, to the use of such polymer solutions for enhancing the production of hydrocarbons from subterranean hydrocarbon-containing formations penetrated by one or more well bores.

2. Prior Art

Viscous aqueous solutions containing organic polymers previously have been utilized for carrying out a variety of treatments in subterranean hydrocarbon-containing formations to increase the production of hydrocarbons therefrom. For example, in the production of oil and gas wells which also produce large volumes of salt water, the cost of producing the salt water, separating it from produced oil and gas and disposing of the salt water represents an economic loss in the operation of the wells. In order to reduce the production of salt water from such wells, viscous aqueous polymer solutions have heretofore been utilized to preferentially reduce water production from portions of the producing subterranean formations. The high molecular weight polymers or copolymers in the aqueous polymer solution plug the pores of the portions of the formation producing water and thereby substantially reduce the permeability of such portions whereby water production is also substantially reduced.

Viscous aqueous polymer solutions also have been utilized in processes for enhancing the recovery of oil from subterranean oil-containing formations. In such processes, the viscous aqueous polymer solution is injected into the formation by way of at least one injection well penetrating the formation and forced through the formation towards at least one production well penetrating the formation whereby the production of oil from the formation is increased. Such processes are usually carried out in subterranean oil-containing formations after primary recovery operations are completed, but they also can be utilized during and as a part of primary recovery operations. In the usual case, during primary recovery operations, the energy required to force oil into producing wells is supplied by the natural pressure drive existing in the formation or by mechanically lifting oil from the formation through the well bores of producing wells to the surface. At the end of primary recovery operations, a substantial quantity of oil often remains in the formation.

In enhanced recovery operations, energy for producing oil remaining in a subterranean oil-containing formation is supplied by injecting liquids or gases through one or more injection wells penetrating the formation into the formation under pressure whereby the liquids or gases drive the oil to producing wells penetrating the formation. The most common of such recovery techniques is known as water flooding wherein an aqueous liquid is injected into the formation under pressure which provides the energy and flushing action necessary to force oil in the formation to one or more production wells penetrating the formation. The efficiency of such water flooding techniques varies greatly depending upon a number of factors including variability in the permeability of the formation and the viscosity of the oil remaining in the formation. When the oil remaining in the formation is of a relatively high viscosity, aqueous flooding media of low viscosity such as fresh water or brine tend to finger through the high viscosity oil front and thereby bypass most of the available oil. In addition, typical subterranean formations contain layers of materials which often have widely varying permeability to liquid flow. Consequently, the aqueous flood medium tends to follow the course of least resistance, that is, flow through zones of high permeability in the formation from which most of the oil has been removed and thereby bypass zones of less permeability still containing substantial quantities of oil.

In order to overcome such problems, flooding media having viscosities in the order of or greater than the vicosities of oils to be displaced have been utilized. Generally, the viscosity of the water flooding medium is increased to a level at which it is close to the viscosity of the oil to be displaced, preferably equal to or greater than the viscosity of the oil to be displaced. This causes the relative mobility of the oil and the flooding medium in the formation to be comparable and the tendency of the flooding medium to finger through the oil front or bypass oil-containing portions of the formation is substantially diminished.

Viscous aqueous fluids containing organic polymers also are used as completion fluids when conducting downhole operations after initial drilling or while waiting to put the well into production. Completion fluids are used to control formation fluid pressure before the well is put on production and while mechanical work is being performed on the formation, for example, perforating, underreaming, milling or the like. The loss of completion fluids to the formation is undesirable. The fluid loss generally can be reduced by increasing the viscosity of the completion fluid.

It would be desirable to provide a method by which an aqueous fluid can be viscosified with a polymer or mixture of polymers which minimizes the quantities of polymer required to recover hydrocarbons from subterranean hydrocarbon-containing formations penetrated by one or more well bores.

SUMMARY OF THE INVENTION

The surprising discovery now has been made that when xanthan gum and a compound comprising at least one member selected from the group consisting of ammonium, hydrogen or alkali metal salts of polystyrene sulfonate, polyvinyl sulfonate and hydrolyzed copolymers of styrene sulfonate and maleic anhydride are admixed with an aqueous fluid that a viscous aqueous fluid is produced having a viscosity greater than the viscosities of solutions containing the individual compounds at the same total polymer concentration.

The viscous aqueous fluid can be used in enhanced oil recovery processes employing conventional formation flooding techniques to recover oil from a subterranean formation. The viscous aqueous fluid also can be used as a packer fluid, perforating fluid, completion fluid and for gelling acid solutions used in the treatment of subterranean hydrocarbon-containing formations.

DESCRIPTION OF THE PREFERRED EMBODIMENT

The present invention relates to a viscosifying composition which, when added to an aqueous fluid, produces an increase in viscosity of the aqueous fluid in excess of that which would be produced by equal quantities of the components of the composition. The viscosifying composition comprises xanthan gum and at least one member selected from the group consisting of ammonium, hydrogen and alkali metal salts of polystyrene sulfonate, polyvinyl sulfonate and hydrolyzed copolymers of styrene sulfonate and maleic anhydride.

The xanthan gum which is employed in the viscosifying composition is available as a commercial material. Xanthan gum comprises the fermentation product produced by the action of a strain of the bacteria Xanthomonas upon carbohydrates.

The polystyrene sulfonate, polyvinyl sulfonate and hydrolyzed copolymers of styrene sulfonate and maleic anhydride also are available materials of commerce. The basic polymer unit for the sulfonates are as follows:

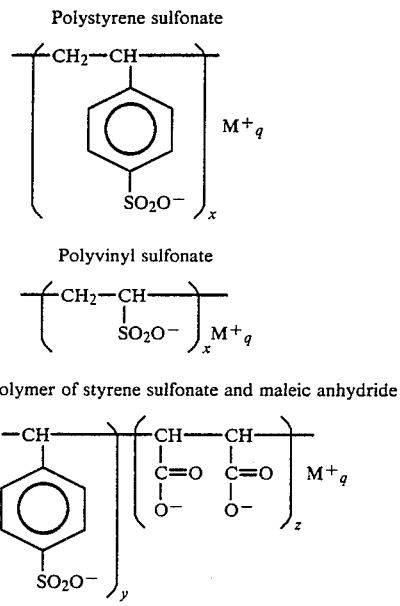

Polystyrene sulfonate

Polyvinyl sulfonate hydrolyzed copolymer of styrene sulfonate and maleic anhydride in which x, y, and z represent the average number of repeating basic units of the polymer chain. The number of repeating units in the polymer chain is defined as the degree of polymerization of the polymer. The symbol M in the formulas represents a positive monovalent ion selected from the alkali metals such as sodium or potassium or an ion such as hydrogen or ammonium. The symbol q is an integer equal to the number of cations required to maintain electrical neutrality The percentage of the number of repeating units of the polymer which are sulfonated is defined as the degree of sulfonation of the polymers Preferably, the value of x in the polymers is in the range of from about 250 to about 50,000. Preferably, x has a value in the range of from about 20,000 to about 40,000. The value of y and z are such that y has a value of at least about 250, y+z is equal to from about 250 to about 50,000 and y comprises at least about 30 percent of the sum of y+z. The degree of sulfonation of the polymers, preferably, is in the range of from about 30 to about 100 percent. Most preferably, the degree of sulfonation is in the range of from about 50 to about 100 percent. The preferred sulfonate polymers have a molecular weight in the range of from about fifty thousand to over seven million. Most preferably, the molecular weight is in the range of from about five to about seven million.

The weight ratio of the xanthan gum to the polystyrene sulfonate, polyvinyl sulfonate, hydrated copolymers of styrene sulfonate and maleic anhydride or admixtures thereof in the viscosifying composition of the present invention is in the range of from about 1 to 10 to about 15 to 1. Preferably, the ratio of xanthan gum to sulfonate polymer is in the range of from about 1 to 5 to about 15 to 1.

The viscosifying composition is admixed with an aqueous fluid which is to be viscosified in an amount sufficient to provide a concentration of at least about 300 parts per million (ppm). Preferably, when the viscosifying composition is to be used to effect enhanced oil recovery utilizing formation flooding techniques, the composition is present in an amount of from about 300 ppm to about 5,000 ppm and, most preferably, about 1,500 ppm to about 2,500 ppm. When the viscosifying composition is to be used in the formulation of packer fluids, perforating fluids, completion fluids or to gel acid solutions, the composition, preferably, is present in an amount sufficient to provide a concentration of at least about 1,500 ppm and, most preferably, in a concentration of at least about 2,500 ppm.

The aqueous fluid which is to be viscosified can comprise fresh water, formation water, brine or the like. The aqueous fluid can comprise any aqueous solution which does not adversely react with the viscosifying composition.

In the use of the viscosifying composition of the present invention in enhanced oil recovery, a conventional water flooding procedure is employed. The viscosified aqueous fluid is prepared by admixing a quantity of the viscosifying composition with an aqueous fluid. The viscosified aqueous fluid then is forced down an injection well penetrating a subterranean hydrocarbon-containing formation and out into the formation by means of conventional pumping equipment located at the wellhead. In the interest of economy, it is preferred to employ the viscosified aqueous fluid in an amount sufficient only to form a flooding front and to follow the viscosified aqueous fluid with additional quantities of the aqueous fluid. Accordingly, after the viscous aqueous fluid has been forced into the injection wells for a period of time sufficient to insure an adequate thickness of viscous flooding front within the formation, its injection is terminated and unviscosified aqueous fluid is injected behind the viscous aqueous fluid to advance the viscous fluid in the formation and force at least a portion of the contained hydrocarbons toward a producing well or wells for recovery therefrom.

The amount of the viscous aqueous fluid required to provide a flooding front of adequate thickness will depend upon the distance between the injection and producing wells and their spacing as well as the porosity of the intervening formation. Desirably, the volume of viscous aqueous fluid should correspond to from about 1 to about 100 percent of the volume of the hydrocarbon pore space of the subterranean formation, however, larger quantities may be employed. Preferably, the volume of viscous aqueous fluid should be in the range of from about ten to fifty percent of the volume of the hydrocarbon pore space.

The viscosified aqueous fluid of the present invention also can contain organic polymer clay or fines stabilizers such as, for example, poly(diallyldimethylammonium chloride), poly(epichlorohydrin-co-dimethylamine) and poly(methacrylamido-4,4,8,8-tetramethyl-4,8-diaza-6-hydroxynonamethylene dichloride). The organic polymer clay stabilizers can be dissolved in the aqueous fluid used to form the viscous aqueous fluid, or admixed with the viscous aqueous fluid prior to injection into the subterranean formation. Other additives such as biocides, surfactants and the like also can be admixed with the viscous aqueous fluid.

When the viscosifying composition is used to viscosify packer fluids, completion fluids, perforation fluids or to gel acids or the like, a sufficient quantity of the viscosifying composition is admixed with the aqueous fluid to provide a desired viscosity and the viscous fluid then is used in a conventional manner which is well known to individuals skilled in the applicable arts.

It has been found that when the viscous aqueous fluid of the present invention is subjected to high shear conditions the viscosity of the fluid is substantially reduced. Surprisingly, upon cessation or reduction in the shear rate, the fluid viscosity increases to substantially the original viscosity of the fluid. Therefore, no formal chemical bonds are believed to be formed between the constituents of the viscosifying composition. While the process presently is unknown, it is believed that the components of the viscosifying composition undergo either molecular chain entanglement or polar interaction or both to form a network-type structure upon hydration which results in the enhanced viscosity of the aqueous fluid.

The viscosifying composition of the present invention can be used in fluids having a temperature of from about ambient or below to in excess of about 200° F.

To illustrate the unexpected viscosity enhancement which results from use of the viscosifying composition of the present invention, and not by way of limitation, the following examples are provided.

EXAMPLE I

To illustrate the unique viscosity enhancement which results from use of the viscosifying composition of the present invention in comparison to the viscosity resulting from other viscosifiers, the following tests were performed. Various solutions were prepared in deionized water utilizing the compounds set forth in the following table at the designated concentrations. A quantity of a selected polystyrene sulfonate, polyvinyl sulfonate or hydrolyzed copolymer of styrene sulfonate and maleic anhydride then was admixed as a second component with each solution to determine whether or not any viscosity enhancement occurred. The viscosity of each of the solutions is determined on a Brookfield LVT Viscometer. The spindle number and rpm used in the test are identified in the table. The symbol UL indicates the UL adaptor was utilized on the viscometer. The percentage of viscosity enhancement is determined by the following equation:

$$\% \text{ viscosity enhancement} = \frac{N_{1+2} - (N_1 + N_2)}{N_1 + N_2} \times 100$$

where
$N_1$ = viscosity of solution containing only the first component, centipoise
$N_2$ = viscosity of solution containing only the second component, centipose
$N_{1+2}$ = viscosity of solution containing both components, centipoise

TABLE I

| First Component | Concentration (ppm) | Second Component[1] | Concentration (ppm) | Viscometer Test Conditions | Viscosity (cp) | Percent Viscosity Enhancement |
| --- | --- | --- | --- | --- | --- | --- |
| — | — | polystyrene sulfonate with molecular weight of about 70,000 (70M) | 1,500 | UL, 30 | 1.2 | — |
| — | — | polystyrene sulfonate with molecular weight of about 500,000 (500M) | 1,500 | UL, 30 | 1.2 | — |
| — | — | polystyrene sulfonate with molecular weight of about 6 million (6MM) | 100 | UL, 60 | 2.1 | — |
| — | — | polystyrene sulfonate with molecular weight of about 6 million (6MM) | 1,000 | UL, 12 | 15.5 | — |
| — | — | polystyrene sulfonate with molecular weight of about 6 million (6MM) | 2,000 | UL, 12 | 32 | — |
| — | — | polystyrene sulfonate with molecular weight of about 6 million (6MM) | 4,000 | 1, 60 | 62.5 | — |
| hydroxyethyl cellulose | 5,000 | — | — | 2, 30 | 244 | — |
| hydroxyethyl cellulose | 5,000 | polystyrene sulfonate (70M) | 995 | 2, 30 | 230 | <0 |
| hydroxyethyl cellulose | 5,000 | polystyrene sulfonate (70M) | 1,990 | 2, 30 | 244 | 0 |
| hydroxyethyl cellulose | 5,000 | polystyrene sulfonate (70M) | 3,979 | 2, 3 | 260 | 5.7 |
| hydroxyethyl | 5,000 | — | — | 1, 6 | 640 | — |

TABLE I-continued

| First Component | Concentration (ppm) | Second Component[1] | Concentration (ppm) | Viscometer Test Conditions | Viscosity (cp) | Percent Viscosity Enhancement |
|---|---|---|---|---|---|---|
| cellulose hydroxyethyl[2] cellulose | 5,000 | polystyrene sulfonate (70M) | 1,174 | 1, 6 | 705 | 10 |
| hydroxyethyl cellulose | 1,000 | — | — | 1, 30 | 4.0 | — |
| hydroxyethyl cellulose | 500 | — | — | 1, 30 | 3.6 | — |
| — | — | polystyrene sulfonate (6M) | 1,000 | 1, 30 | 5.4 | — |
| — | — | polystyrene sulfonate (6M) | 500 | 1, 30 | 1.4 | — |
| hydroxyethyl cellulose | 500 | polystyrene sulfonate (6M) | 500 | 1, 30 | 12.0 | 140 |
| guar | 5,000 | — | — | 2, 30 | 340 | — |
| guar | 5,000 | polystyrene sulfonate (70M) | 995 | 2, 30 | 355 | 4.1 |
| guar | 5,000 | polystyrene sulfonate (70M) | 1,990 | 2, 30 | 362 | 6.2 |
| guar | 5,000 | polystyrene sulfonate (70M) | 3,979 | 2, 30 | 365 | 7.04 |
| hydroxypropyl guar | 5,000 | — | — | 1, 12 | 208 | — |
| hydroxypropyl guar | 5,000 | polystyrene sulfonate (70M) | 995 | 2, 30 | 215 | 2.87 |
| hydroxypropyl guar | 5,000 | polystyrene sulfonate (70M) | 1,990 | 2, 30 | 218 | 4.3 |
| hydroxypropyl guar | 5,000 | polystyrene sulfonate (70M) | 3,979 | 2, 30 | 218 | 4.3 |
| xanthan gum | 5,000 | — | — | 2, 30 | 585 | — |
| xanthan gum | 5,000 | polystyrene sulfonate (70M) | 995 | 2, 12 | 1,888 | 222 |
| xanthan gum | 5,000 | polystyrene sulfonate (70M) | 1,990 | 2, 12 | 2,062 | 252 |
| xanthan gum | 5,000 | polystyrene sulfonate (70M) | 3,979 | 2, 12 | 2,170 | 270 |
| xanthan gum | 5,000 | — | — | 2, 30 | 604 | — |
| xanthan gum | 5,000 | polystyrene sulfonate (500M) | 995 | 2, 30 | 809 | 33.3 |
| xanthan gum | 5,000 | polystyrene sulfonate (500M) | 1,990 | 2, 30 | 915 | 50.7 |
| xanthan gum | 5,000 | polystyrene sulfonate (500M) | 3,979 | 2, 30 | 2,035 | 235 |
| xanthan gum | 5,000 | polystyrene sulfonate (6MM) | 995 | 2, 30 | 890 | 43.5 |
| xanthan gum | 5,000 | polystyrene sulfonate (6MM) | 1,990 | 2, 12 | 2,355 | 270 |
| xanthan gum | 5,000 | polystyrene sulfonate (6MM) | 3,979 | 3, 6 | 5,700 | 754 |
| 60% locust bean gum, 40% xanthan gum | 1,500 | — | — | 2, 30 | 126 | — |
| 60% locust bean gum, 40% xanthan gum | 1,500 | polystyrene sulfonate (6MM) | 1,500 | 2, 30 | 320 | 144 |
| 60% locust bean gum, 40% xanthan gum | 250 | — | — | 1, 60 | 9 | — |
| 60% locust bean gum, 40% xanthan gum | 250 | polystyrene sulfonate (6MM) | 100 | 1, 60 | 13 | 15 |
| xanthan gum | 1,500 | — | — | 2, 30 | 132 | — |
| xanthan gum | 1,500 | polystyrene sulfonate (6MM) | — | 2, 30 | 678 | 396 |
| xanthan gum | 5,000 | — | — | 2, 6 | 1,596 | — |
| — | — | polyvinyl sulfonate | 10,000 | 2, 6 | 5 | — |
| xanthan gum | 5,000 | polyvinyl sulfonate | 10,000 | 2, 6 | 3,116 | 94.6 |
| — | — | hydrolyzed poly(styrene[3] sulfonate-co-maleic anhydride) | 4,000 | 2, 6 | 0 | — |
| — | — | hydrolyzed poly(styrene sulfonate-co-maleic anhydride) | 2,000 | 2, 6 | 0 | — |
| — | — | hydrolyzed poly(styrene sulfonate-co-maleic anhydride) | 1,000 | 2, 6 | 0 | — |
| xanthan gum | 5,000 | — | — | 2, 6 | 1,648 | — |
| xanthan gum | 5,000 | hydrolyzed poly(styrene sulfonate-co-maleic anhydride) | 4,000 | 2, 6 | 3,877 | 136 |
| xanthan gum | 5,000 | hydrolyzed poly(styrene sulfonate-co-maleic anhydride) | 2,000 | 2, 6 | 3,895 | 136 |
| xanthan gum | 5,000 | hydrolyzed poly(styrene | 1,000 | 2, 6 | 2,930 | 77.8 |

TABLE I-continued

| First Component | Concentration (ppm) | Second Component[1] | Concentration (ppm) | Viscometer Test Conditions | Viscosity (cp) | Percent Viscosity Enhancement |
|---|---|---|---|---|---|---|
| | | sulfonate-co-maleic anhydride) | | | | |

[1] All compounds are sodium salts
[2] Solution prepared in $CaBr_2$—$CaCl_2$ brine
[3] Hydrolyzed sodium polystyrene sulfonate-co-maleic anhydride, 1:1 copolymer The results of the tests clearly illustrate the desirable and beneficial viscosity enhancement which results in a fluid when the viscosifying composition of the present invention is admixed therewith.

EXAMPLE II

To determine the effect of pH upon the viscosifying composition of the present invention various solutions were prepared utilizing the aqueous fluids set forth in the following table. The viscosity of the solution is determined as in Example I.

than gum decomposition in view of the results with the 3.1% HCl solution.

EXAMPLE III

To determine the effect of the viscosifying composition of the present invention in an aqueous fluid utilized in an enhanced oil recovery treatment, the following test is performed.

Experimental Apparatus:

Four-foot glass columns having an inside diameter of 1.18 inches are packed with Oklahoma No. 1 sand hav-

TABLE II

| First Component | Concentration (ppm) | Second Component | Concentration (ppm) | Aqueous Fluid and pH | Viscometer Test Conditions | Viscosity cp |
|---|---|---|---|---|---|---|
| xanthan gum | 5,000 | — | — | deionized water (10.8) | 2, 30 | 604 |
| xanthan gum | 5,000 | polystyrene sulfonate (6MM) | 995 | deionized water (10.8) | 2, 30 | 890 |
| xanthan gum | 5,000 | polystyrene sulfonate (6MM) | 1,990 | deionized water (10.8) | 2, 12 | 2,355 |
| xanthan gum | 5,000 | polystyrene sulfonate (6MM) | 3,979 | deionized water (10.8) | 3, 6 | 5,700 |
| xanthan gum | 5,000 | — | — | 9.75 lb/gal NaCl (9.5) | 2, 30 | 592 |
| xanthan gum | 5,000 | polystyrene sulfonate (6MM) | 498 | 9.75 lb/gal NaCl (9.5) | 2, | 734 |
| xanthan gum | 5,000 | polystyrene sulfonate (6MM) | 995 | 9.75 lb/gal NaCl (9.5) | 2, 30 | 774 |
| xanthan gum | polystyrene sulfonate (6MM) | 995 | 9.75 | lb/gal NaCl (9.5) | 2, 30[1] | 815 |
| xanthan gum | 5,000 | — | — | 13% acetic acid | 2, 30 | 220 |
| xanthan gum | 5,000 | polystyrene sulfonate (6MM) | 498 | 13% acetic acid | 2, 30 | 340 |
| xanthan gum | 5,000 | polystyrene sulfonate (6MM) | 995 | 13% acetic acid | 2, 30 | 460 |
| xanthan gum | 5,000 | — | — | 5% acetic acid | 2, 30 | 220 |
| xanthan gum | 5,000 | polystyrene sulfonate (6MM) | 498 | 5% acetic acid | 2, 30 | 308 |
| xanthan gum | 5,000 | polystyrene sulfonate (6MM) | 995 | 5% acetic acid | 2, 30 | 494 |
| xanthan gum | 5,000 | — | — | 5% HCl | 2, 30 | 192 |
| xanthan gum | 5,000 | polystyrene sulfonate (6MM) | 995 | 5% HCl | 2, 30 | 184 |
| xanthan gum | 5,000 | polystyrene sulfonate (6MM) | 1,990 | 5% HCl | 2, 30 | 178 |
| xanthan gum | 5,978 | — | — | 3.1% HCl | 3, 30 | 891 |
| xanthan gum | 5,978 (6MM) | polystyrene sulfonate | 3,587 | 3.1% HCl | [2]3, 30 | 1,220 |
| xanthan gum | 5,978 | polystyrene sulfonate (6MM) | 3,587 | 3.1% HCl | 3, 30[3] | 999 |

[1] Viscosity determined after stirring solution for 15 hours.
[2] Viscosity determined after stirring solution for 5 minutes.
[3] Viscosity determined after stirring solution for 20 minutes.

The results of the tests clearly illustrate that viscosity enhancement occurs in the identified fluids upon admixing with the viscosifying composition of the present invention. The decrease in the viscosity of the 5% HCl solution appears to be the result of acid promoted xaning a particle size in the range of from about 70 to 170 mesh on the U.S. Sieve Series. The ends of the tubes are sealed with plugs having an entry and exit port, respectively.

Experimental Procedure:

The columns are positioned vertically and the permeability is determined by the injection of a quantity of fresh water at 1 psi at ambient temperature. The pore volume of the packed columns is approximately 140 cc. A quantity of a viscous oil (approximately 40 centipose) then is introduced into the column to saturate the sand pack. Thereafter, 300 cc of deionized water are injected into the column followed by 140 cc of a viscous fluid and, finally, 250 cc of deionized water. The viscous fluids which were employed are identified in Table III hereafter. The following symbols are employed in the Table:

OOIP: original oil in place in column, cc

ORIP: oil remaining place after water flood, determined by OOIP - oil recovered in water flood EOR: enhanced oil recovery, percentage determined by cc of oil recovered employing viscous fluid divided by cc of OOIP×100 or cc oil recovered divided by cc of ORIP×100

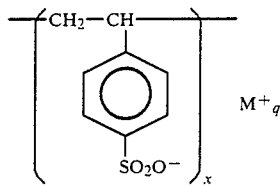

a polyvinyl sulfonate having the formula

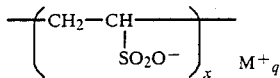

a hydrolyzed copolymer of styrene sulfonate and maleic anhydride

TABLE III

| Test No. | Column Permeability (Darcies) | OOIP, cc | Waterflood Recovery | | Viscous Fluid Component and Concentration, ppm | | Frontal Advance of Fluids (Ft/Day) | EOR | | |
|---|---|---|---|---|---|---|---|---|---|---|
| | | | cc, oil | % OOIP | | | | cc oil | % OOIP | % ORIP |
| 1 | 13.4 | 110 | 71.0[1] | 64.6 | — | | 1.14 | — | — | — |
| 2 | 16.73 | 88 | 54.5 | 61.9 | polystyrene sulfonate (6MM) | 1,000 | 1.72 | 1.5 | 1.7 | 4.5 |
| 3 | 17.34 | 109 | 50.5 | 46.3 | xanthan gum | 1,000 | 1.39 | 19.0 | 17.4 | 32.5 |
| 4 | 14.15 | 92 | 54.0 | 58.7 | xanthan gum | 500 | | | | |
| | | | | | polystyrene sulfonate (6MM) | 500 | 1.13 | 14.5 | 15.8 | 38.2 |

[1] 450 cc of water employed in waterflood, no other fluid injected

The data set forth above clearly illustrates the beneficial results which derive from use of the viscosifying composition of the present invention in enhanced oil recovery treatments. The enhanced viscosity of the viscous fluid permits substantially lower viscosifying agent concentrations to be employed than otherwise necessary to recover additional oil from the subterranean formations.

While that which presently is considered to be the preferred embodiment of the invention has been described, it is to be understood that variations and modifications which will become apparent to those individuals skilled in the art can be made in this invention without departing from the spirit and scope thereof.

What is claimed is:

1. A process for recovering hydrocarbons from a subterranean hydrocarbon-containing formation penetrated by at least one injection well and at least one production well comprising:

injecting into said formation through said injection well a viscosified aqueous fluid comprising as aqueous fluid having dissolved therein a sufficient quantity of a viscosifying composition to provide a concentration of at least about 300 ppm, said viscosifying composition comprising xanthan gun and at least one member selected from the group consisting of ammonium, hydrogen and alkali metal salts of a polystyrene sulfonate having the formula

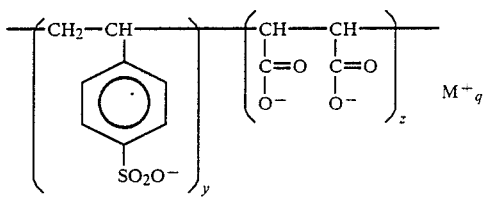

wherein x has a valve in the range of from about 250 to about 50,000, y has a value of at least about 250, the sum of y+z is in the range of from about 250 to about 50,000 and y comprises at least 30 percent of y+z, M comprises at least one member selected from the group consisting of hydrogen, ammonium and alkali metals and q is an integer equal to the number of cations required to maintain electrical neutrality, the ratio of said xanthan gum to said member selected from the salts of said polystyrene sulfonate, polyvinyl sulfonate, hydrolyzed copolymer of styrene sulfonate and maleic anhydride or a mixture thereof in said viscosifying composition being in the range of from about 1 to 10 to about 15 to 1;

forcing said viscosified aqueous fluid through said formation; and recovering hydrocarbons from said production well.

2. The process of claim 1 wherein the ratio of xanthan gum to said member selected from the salts of said polystyrene sulfonate, polyvinyl sulfonate, hydrolyzed copolymer of styrene sulfonate and maleic anhydride or a mixture thereof in said viscosifying composition is in the range of from about 1 to 5 to about 15 to 1.

3. The process of claim 1 wherein said viscosifying composition is present in an amount sufficient to provide a concentration in the viscosified aqueous fluid in the range of from about 300 ppm to about 5,000 ppm.

4. The process of claim 1 wherein said viscosifying composition is present in an amount sufficient to provide a concentration in the viscosified aqueous fluid in the range of from about 1,500 ppm. to about 2,500 ppm.

* * * * *

UNITED STATES PATENT AND TRADEMARK OFFICE
CERTIFICATE OF CORRECTION

PATENT NO. : 4,508,629 (Page 1 of 5)
DATED : April 2, 1985
INVENTOR(S) : Borchardt It is certified that error appears in the above-identified patent and that said Letters Patent is hereby corrected as shown below:

Table II, entry 6, reads

"
| First Component | Concentration (ppm) | Second Component | Concentration (ppm) | Aqueous Fluid and pH | Viscometer Test Conditions | Viscosity cp |
|---|---|---|---|---|---|---|
| xanthan gum | 5,000 | polystyrene sulfonate (6MM) | 498 | 9.75 | lb/gal NaCl | 2,734 |
"

at Table II, entry 6 should read

—
| First Component | Concentration (ppm) | Second Component | Concentration (ppm) | Aqueous Fluid and pH | Viscometer Test Conditions | Viscosity cp |
|---|---|---|---|---|---|---|
| xanthan gum | 5,000 | polystyrene sulfonate (6MM) — | 498 | 9.75 (9.5) | lb/gal NaCl | 2, 30 | 734 |

UNITED STATES PATENT AND TRADEMARK OFFICE
CERTIFICATE OF CORRECTION

PATENT NO. : 4,508,629  (Page 2 of 5)
DATED : April 2, 1985
INVENTOR(S) : Borchardt It is certified that error appears in the above-identified patent and that said Letters Patent is hereby corrected as shown below:

Table II, entry 8, reads

"

| First Component | Concentration (ppm) | Second Component | Concentration (ppm) | Aqueous Fluid and pH | Viscometer Test Conditions | Viscosity cp |
|---|---|---|---|---|---|---|
| xanthan gum | | polystyrene sulfonate | 995 | 9.75 lb/gal NaCl | 2,30[1] | 815 |

"

at Table II, entry 8 should read

—

| First Component | Concentration (ppm) | Second Component | Concentration (ppm) | Aqueous Fluid and pH | Viscometer Test Conditions | Viscosity cp |
|---|---|---|---|---|---|---|
| xanthan gum | 5,000 | polystyrene sulfonate (HM)— | 995 | 9.75 lb/gal NaCl (9.5) | 2,30[1] | 815 |

UNITED STATES PATENT AND TRADEMARK OFFICE
CERTIFICATE OF CORRECTION

PATENT NO. : 4,508,629          (Page 3 of 5)
DATED : April 2, 1985
INVENTOR(S) : Borchardt It is certified that error appears in the above-identified patent and that said Letters Patent is hereby corrected as shown below:

at Table II, entry 19, reads

"

| First Component | Concentration (ppm) | Second Component | Concentration (ppm) | Aqueous Fluid and pH | Viscometer Test Conditions | Viscosity cp |
|---|---|---|---|---|---|---|
| xanthan gum (6MM) | 5,978 | polystyrene sulfonate" | 3,587 | 3.1% HCl | 3, 30$^2$ | 1,220 | at Table II, entry 19 should read

—

| First Component | Concentration (ppm) | Second Component | Concentration (ppm) | Aqueous Fluid and pH | Viscometer Test Conditions | Viscosity cp |
|---|---|---|---|---|---|---|
| xanthan gum | 5,978 | polystyrene sulfonate (6MM) | 3,587 | 3.1% HCl | 3, 30$^2$ | 1,220 |

—

UNITED STATES PATENT AND TRADEMARK OFFICE
CERTIFICATE OF CORRECTION

PATENT NO. : 4,508,629  (Page 4 of 5)

DATED : April 2, 1985

INVENTOR(S) : Borchardt

It is certified that error appears in the above-identified patent and that said Letters Patent is hereby corrected as shown below:

At Table II, entry 20, reads

"

| First Component | Concentration (ppm) | Second Component | Concentration (ppm) | Aqueous Fluid and pH | Viscometer Test Conditions | Viscosity cp |
|---|---|---|---|---|---|---|
| xanthan gum | 5,978 | polystyrene sulfonate | 3,587 (6MM) | 3.1% HCl | 3, 30$^3$ | 999 |

"

at Table II, entry 20, should read

—

| First Component | Concentration (ppm) | Second Component | Concentration (ppm) | Aqueous Fluid and pH | Viscometer Test Conditions | Viscosity cp |
|---|---|---|---|---|---|---|
| xanthan gum | 5,978 | polystyrene sulfonate (6MM) | 3,587 | 3.1% HCl | 3, 30$^3$ | 999 |

—

UNITED STATES PATENT AND TRADEMARK OFFICE
CERTIFICATE OF CORRECTION

PATENT NO. : 4,508,629 (Page 5 of 5)

DATED : April 2, 1985

INVENTOR(S) : Borchardt

It is certified that error appears in the above-identified patent and that said Letters Patent is hereby corrected as shown below:

In Column 12, line 49, the word "valve" should read --value-- as set forth in the specification as filed on page 32, line 6.

Signed and Sealed this

Twenty-first Day of October, 1986

[SEAL]

Attest:

DONALD J. QUIGG

Attesting Officer     Commissioner of Patents and Trademarks